United States Patent [19]
Guedan et al.

[11] Patent Number: 5,592,653
[45] Date of Patent: Jan. 7, 1997

[54] INTERFACE CONVERSION DEVICE

[75] Inventors: Juan A. Guedan; Ana Ma del Mar M. Martin, both of Madrid, Spain

[73] Assignee: Alcatel, N.V., Amsterdam, Netherlands

[21] Appl. No.: 230,097

[22] Filed: Apr. 20, 1994

[30] Foreign Application Priority Data

Apr. 30, 1993 [ES] Spain ..................... 9300926

[51] Int. Cl.$^6$ ................... H04J 3/06; H04J 3/07
[52] U.S. Cl. ................ 395/500; 395/800; 395/412; 395/484; 364/222.2; 364/239; 364/239.1; 370/465
[58] Field of Search ................... 375/225, 219, 375/220, 257, 377, 242; 370/68, 58, 49, 84, 112, 110.1, 79; 364/939.5, 222.2; 395/872, 412, 484

[56] References Cited

U.S. PATENT DOCUMENTS

| | | | |
|---|---|---|---|
| 4,042,783 | 8/1977 | Gindi | 179/15 |
| 4,545,052 | 10/1985 | Steierman | 370/68 |
| 4,597,074 | 6/1986 | Demichelis et al. | 370/58 |
| 4,748,618 | 5/1988 | Brown et al. | 370/49 |
| 4,755,988 | 7/1988 | Nelson et al. | 370/84 |
| 4,764,921 | 8/1988 | Graves et al. | 370/100 |
| 4,780,869 | 10/1988 | Engdahl et al. | 370/16 |
| 4,862,480 | 8/1989 | Gupta | 375/37 |
| 4,924,464 | 5/1990 | Baylock | 370/112 |
| 4,941,154 | 7/1990 | Wei | 375/39 |
| 5,020,057 | 5/1991 | Taniguchi et al. | 370/102 |
| 5,040,170 | 8/1991 | Upp et al. | 359/135 |
| 5,060,229 | 10/1991 | Tyrrell et al. | 370/110.1 |
| 5,291,485 | 3/1994 | Afify et al. | 370/77 |
| 5,371,737 | 12/1994 | Nelson et al. | 370/84 |
| 5,394,439 | 2/1995 | Hemmati | 375/242 |
| 5,477,533 | 12/1995 | Tsurumaki | 370/29 |

FOREIGN PATENT DOCUMENTS 0150940  8/1985  European Pat. Off. .
0222544  5/1987  European Pat. Off. .

Primary Examiner—Kevin J. Teska
Assistant Examiner—Thai Phan
Attorney, Agent, or Firm—Ware, Fressola, Van Der Sluys & Adolphson

[57] ABSTRACT

An interface conversion device performs a conversion between input data streams and standard interfaces with the same information rate. The device may comprise a first line receiver (RX1) for a first input data stream that detects errors in the received stream and an interface converter (IC1) that suppresses the bits in it not carrying information and performs the interface conversion. It also comprises a second interface converter (IC2) and a line transmitter (TX1) for conversion in the opposite direction. It may also comprise or include a second line receiver (RK2) for a second input data stream that detects the errors in the received stream, a memory module (MM1) where various frames of the incoming interface are stored in the addresses indicated by a memory control module (MCM), such that reading this sequentially generates the equivalent standard type interfaces. There may also be another memory module (MM2) and another line transmitter (TX2) that perform the conversion in the opposite direction.

10 Claims, 2 Drawing Sheets

INTERFACE CONVERSION DEVICE

TECHNICAL FIELD

The present invention relates to telecommunications and, more particularly, to conversion of a proprietary interface to a standard interface.

BACKGROUND TO THE INVENTION

There are various standard interfaces for the transmission of data in digital form that must ensure that communications between the different parts that constitute a system occur in a reliable manner thanks to the correct interpretation of the data contained in these interfaces. Below, in the description, different standard interfaces are explained for 2 Mb/s and 512 kb/s.

There are also a great variety of internal interfaces that are normally employed by companies engaged in the design of communications equipments in order to make best use of the features available within a closed communications equipment or system, based, fundamentally, on criteria such as signals employed, signal availability, error protection, etc. In this respect, Alcatel has specified internal interfaces termed SBI*I1 and SBI*I2 for 4 Mb/s, the net information rate of which corresponds to that of the aforementioned standard interfaces of one 2 Mb/s channel and eight standard 512 kb/s interfaces, respectively. See, e.g., U.S. Pat. No. 5,060,229 to Tyrrell et al for background information concerning an internal interface of the "SBI" type.

DISCLOSURE OF INVENTION

Up until now, the equipments making use of these internal interfaces had no need to interchange information streams with other system that used standard interfaces, consequently the problem of performing this kind of conversion did not arise. However, nowadays, the flexibility of the current range of communications equipments permits high-level interconnectability; for this reason, both interfaces must be adapted so that the information interchanged is correctly interpreted by the equipments or systems that make use of it through the corresponding interfaces. A new requirement has therefore arisen for which no technical solution exists.

Consequently the technical problem to be overcome consists in forming a communications link between systems, in both directions, that employ different line interfaces of the Alcatel internal interface types and standard 2 Mb/s and 512 kb/s interfaces.

The conversion device according to the invention is characterised in that it comprises a first line receiver that receives first and second serial data streams, identical to each other, producing at its output only one of the two input streams, the choice of which depending on a first control signal.

It also comprises a first interface converter that receives the serial data stream coming from the first line receiver and which produces at its output a third serial data stream that contains only the information bits of each word, the bits without information and the parity bit being suppressed, its bit rate being therefore one half that of the input.

It also comprises a second interface converter that receives a fourth serial data stream with a standard 2 Mb/s interface, and which generates at its output a fifth serial data stream with a bit rate twice that of the input through the insertion of an information-free byte after each of the bytes containing information that constitute each channel, and a first line transmitter that receives the previous fifth serial data stream, calculates the parity bit for each channel and inserts it in the last bit of each channel, and transmits it in duplicate by means of the sixth and the seventh serial data streams.

The device according to the invention also includes a second line receiver that receives a eighth and a ninth serial data streams, identical to each other, and which produces at its output only one of them, this having been selected by means of a second control signal. Up to four frames of the serial data stream coming from this second line receiver is stored in a first memory module, it being possible to read this memory module in such a way that the data from the eighth and ninth serial data streams can be demapped and transmitted via eight standard type interfaces. In the same manner the opposite process can be carried out, for which a second memory module is included that receives eight standard interfaces and stores a complete frame of each of the standard interfaces in order to perform a mapping procedure that allows, in the reading process, the constitution of a serial data stream of the same type as that of the eighth and ninth streams.

Finally it has a second line transmitter that receives the previous serial data stream and inserts a cyclic redundancy check bits into words 15 and 31 in order to subsequently duplicate the resulting signal and produce at its output an eleventh and a twelfth serial data streams, identical to each other.

Consequently, the device of the invention permits a highly reliable transparent connection to the made between systems using the above mentioned interfaces.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
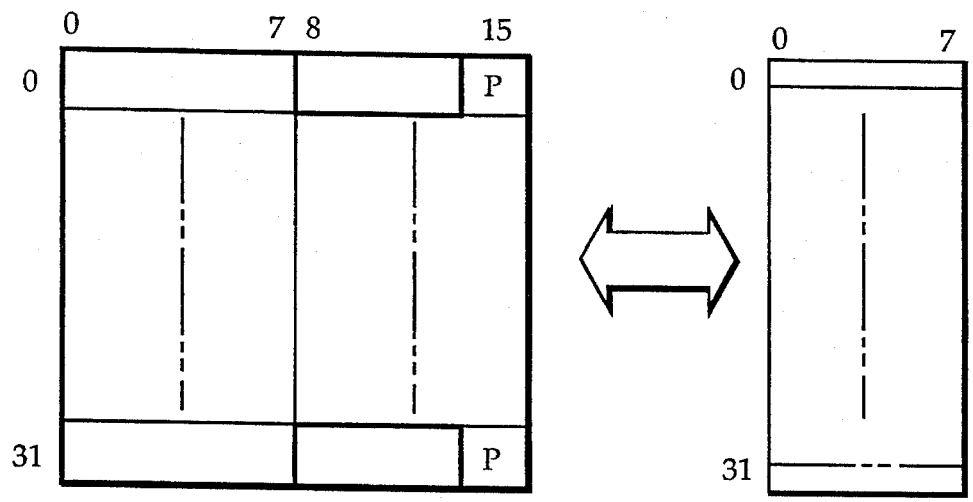
FIG. 1 shows the arrangement of an SBI*I1 type interface and of the standard 2 Mb/s interface.
Figure 3:
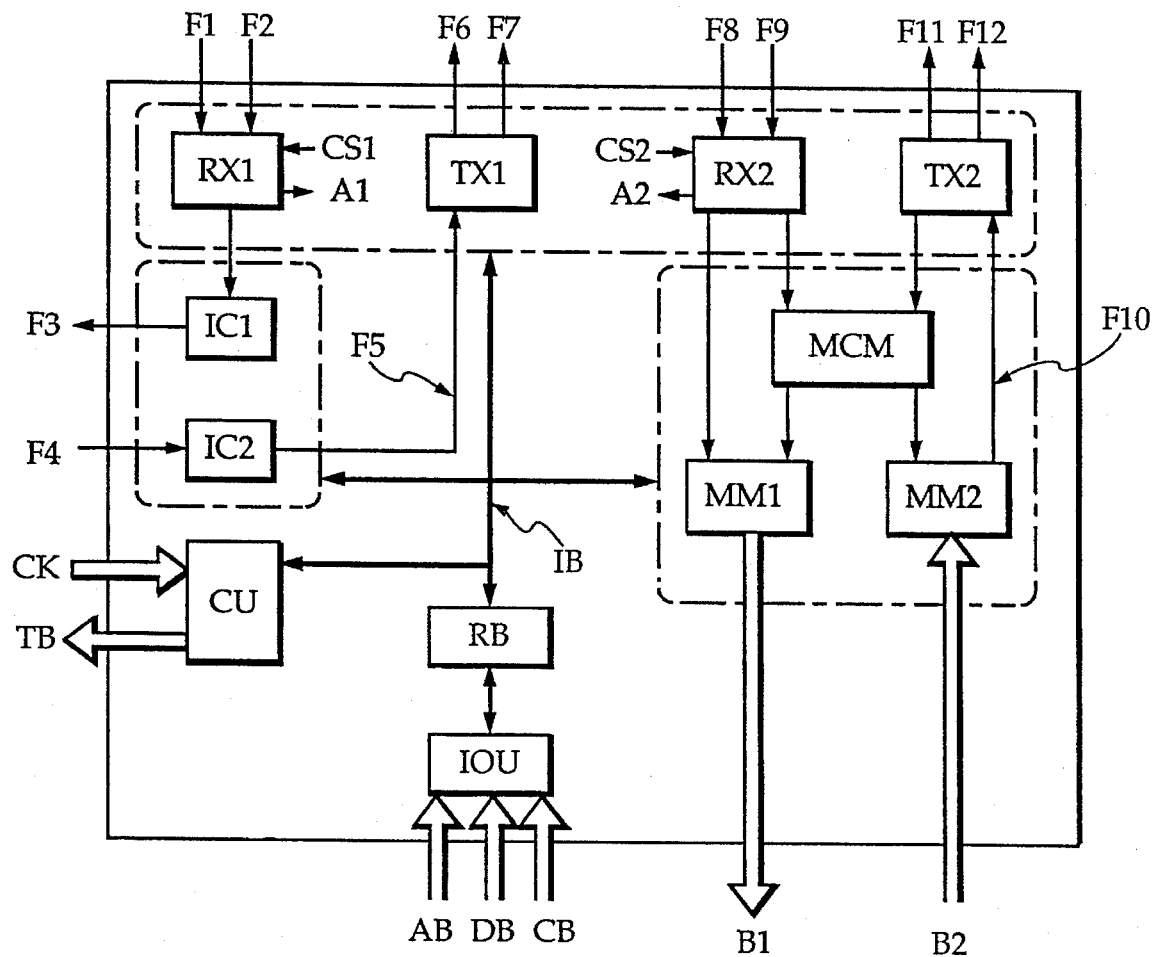
FIG. 3 shows a block diagram of the device according to the invention.

As shown in FIG. 3, the device according to the invention receives the input data with an internal interface formed by a first and a second serial data streams F1 and F2 which, in the absence of errors, are identical, the frame structure of which, as shown to the left in FIG. 1, consists of 32 channels numbered from 0 to 31, each of 16 bits, numbered from 0 to 15, in which the first 8 bits correspond to information bits, the following 7 bits are bits without information, and bit 15 is a parity bit for each channel contained in the frame.

FIG. 3 shows how these serial data streams F1 and F2 are received in a first line receiver RX1 which checks, for both of them, the parity of each channel and compares it with the received parity bit, in order to produce an alarm indication A1 if they are not identical. In addition it performs a bit by bit comparison of the two streams as another method of error detection, again producing the alarm indication A1 if differences occur in corresponding bits. As a result of the alarms produced, the line receiver RX1 receives a first control signal CS1 which selects which of the two serial data streams F1 or F2 has to pass on to a first interface converter IC1 which suppresses the 8 bits that do not carry information (from 8 to 15 in each channel) in order to transmit only the other 8 bits with information (0 to 7) in each channel. The result is a standard 2 Mb/s interface frame, as is also shown to the right in FIG. 1, transmitted over the third serial data stream F3.

The above process is also carried out in the opposite direction. A fourth serial data stream F4 with a standard 2 Mb/s interface is received and is applied to a second interface converter IC2 which, after the eight bits of each of the 32 channels with this standard interface, inserts another 8 bits without information. In this way a fifth serial data stream F5 is formed, with a bit rate that is twice that of the input stream. This serial data stream F5 is sent to a first line transmitter TX1 which calculates the parity bit for each of the resulting 16-bit channels and inserts it into bit 15 and which also duplicates the resulting stream in order to transmit a sixth and and a seventh serial data streams at 4 Mb/s that are adapted to the SBI*I1 interface of Alcatel.

Figure 2:
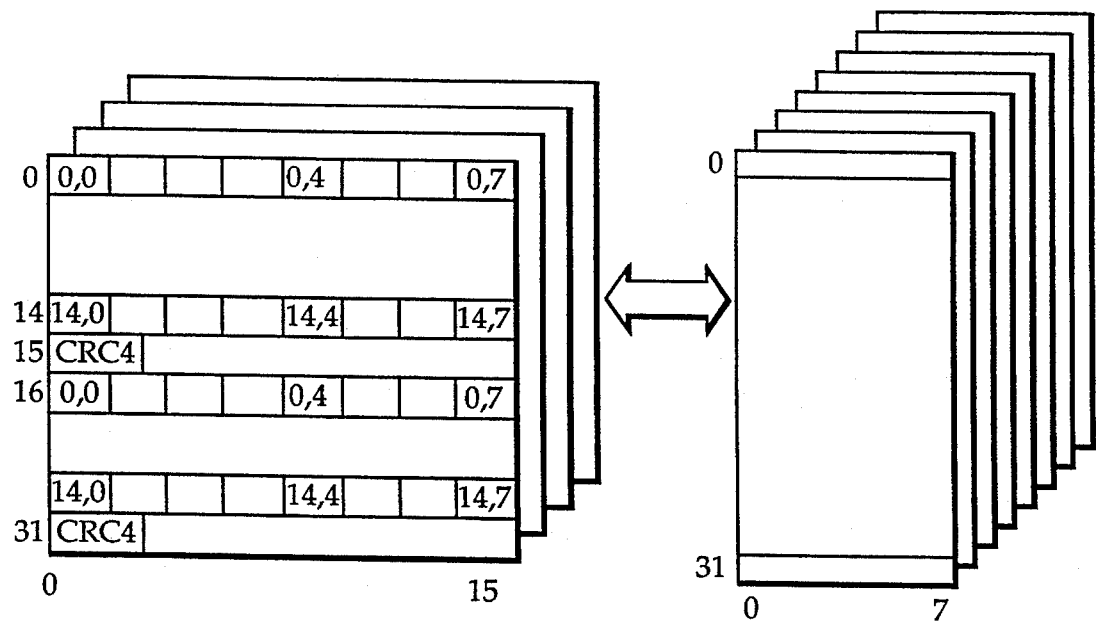
FIG. 2 shows the arrangement of an SBI*I2 type interface and of the standard interface for 512 kb/s channels.

Similarly there is a two-way conversion process for Alcatel 4 Mb/s internal interfaces to standard 512 kb/s interfaces. The frame structure of these interfaces is shown in FIG. 2, in which it is possible to see on the left the frame that carries this Alcatel internal interface and which is made up of 32 words, numbered from 0 to 31, which, in turn, are formed by 8 pairs of bits, numbered from 0 to 7, each pair forming part of a different information channel, such that it is necessary to receive four interface frames in order to complete any standard 512 kb/s interface frame. The number of completed standard interface frames in this case is 32 for every four frames of this 4 Mb/s interface, distributed over eight standard 512 kb/s interfaces. In addition, words number 15 and 31 contain no information, instead each contains four cyclic redundancy check bits calculated from the preceding 240 bits (15 words, each with 8 bit pairs), in which the other 12 bits of these words do not contain any information.

In the standard 512 kb/s interface, the frame consists of 32 channels, numbered from 0 to 31, each of eight bits, so that, in order to complete, for example, the channel 0 of one of these interfaces, it will be necessary to receive the pair 0 of the word 0 of a first frame, that would occupy the first two bits of the first channel of the standard 512 kb/s interface. The same pair of the second frame would occupy bits 2 and 3; the same pair of the third frame would occupy bits 4 and 5; and the fourth frame would occupy the last two bits 6 and 7 of the first channel of the 512 kb/s standard interface.

This process is done in the device of the invention by means of a second line receiver RX2 that receives an eighth serial data stream F8 and a ninth serial data stream F9 and which monitors the state of the four cyclic redundancy check bits in the instants in which they are received by each of the serial data streams F8 and F9, such that a second alarm indication A2 is produced in the event of an error being detected. It also carries out a bit by bit comparison of both streams as a method of error detection, the result of which also affects the error indication output.

As a result of this second alarm indication A2, a second control signal CS2 is received which selects which of the two serial data streams F8 or F9 is to be sent to a first memory module MM1 into which are written the information bits (30 information channels, each with 16 bits) of four consecutive frames, its size therefore being 1920 bits.

The write addresses of this memory are controlled by a memory control module MCM such that during the sequential reading a demapping process occurs that gives rise to the formation of eight standard 512 kb/s interfaces grouped in a first bus B1 as is shown in FIG. 3.

For the opposite direction of conversion between the interfaces mentioned above, the device of the invention has a second memory module MM2 that receives a second bus B2 which has 8 standard 512 kb/s interfaces and in which the write addresses are controlled by the memory control module MCM; the size of this second memory module MM2 being the same as the first, that is 1920 bits, corresponding to four consecutive frames of the above described Alcatel internal interface. Reading this second memory module MM2 according to the addresses indicated by the memory control module MCM results in a serial data stream mapped according to this internal interface that is transmitted to a second line transmitter TX2 that performs the calculation of the four cyclic redundancy check bits corresponding to the first fifteen channels of the frame of the internal interface and inserts them into channel number 15 and, in a similar manner, for the channels 16 to 30, for which the cyclic redundancy check bits are inserted into the first four bits of channel number 31. The second line transmitter TX2 also serves to duplicate this information in order to transmit two identical serial data streams F11 and F12 that constitute the Alcatel 4 Mb/s interface.

Figure 4:
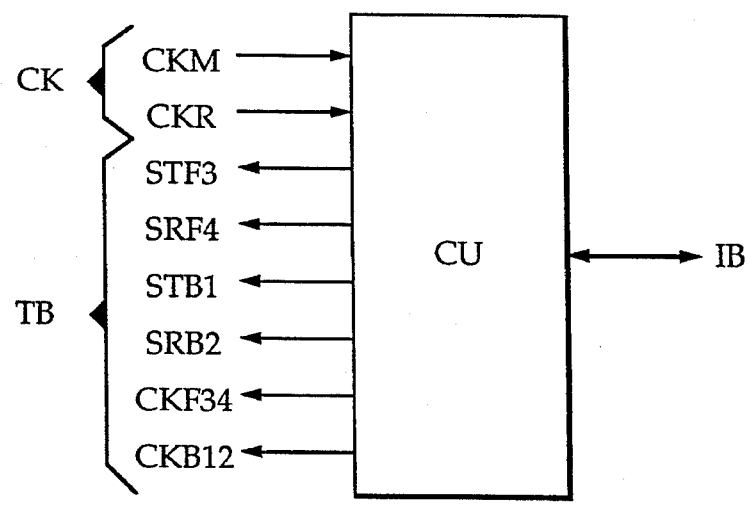
FIG. 4 shows the signals that form the input and output busses of the control unit of the device of the invention.

The device also has a register bank RB in which operating mode configuration information is stored, such as: type of parity used in the internal interface, polynomial used in the cyclic redundancy check, and on which set of bits test patterns are acting within each frame, it being possible in this way to perform selective tests on those channels that are not being used while the rest are working normally. All this is achieved by means of the commands issued by a control unit CU that receives, as shown in FIG. 4, a system clock CKM from which by means of consecutive divisions it generates all necessary timing signals. In particular it produces the reception synchronising signals SRF4 and SRB2 for the incoming signals with standard interfaces, which are those corresponding to the fourth serial data stream F4 (which is a standard 2 Mb/s interface) and to the second bus B2 which, in turn, contains eight standard 512 kb/s interfaces. These reception synchronising signals are activated in bit 7 of channel 31. Also transmission synchronising signals STF3 and STB1 for the standard interface output signals are generated, which are those of the third serial data stream F3 and the first bus B1 which, in turn, contains eight standard 512 kb/s interfaces. These transmission synchronising signals are activated in bit 0 of channel 0.

The control unit CU also transmits bit clock signals CKF34 for 2 Mb/s and CKB12 for 512 kb/s corresponding to the data streams of the standard interfaces used.

In addition, the control unit CU receives a reference clock CKR, at a higher frequency than that of the system, with which it samples the system clock in order to detect it, whereby, if the number of equal consecutive samples is greater than the frequency ratio of the reference clock CKR and the sampled clock, then a loss of clock alarm is produced.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. An interface conversion device, comprising:

a first line received (RX1), responsive to a first input serial data stream (F1) and a second input serial data stream (F2), identical to each other, each having information bits, a parity bit and bits without information in each of a plurality of channels thereof, for providing a single serial data stream corresponding to one of the first and second input serial data streams that is selected by a first control signal (CS1) to which the first line receiver is also responsive;

a first interface converter (IC1), responsive to the single serial data stream, for providing a third serial data stream (F3) that contains only the information bits of the single serial data stream, transmitted at one half of an input bit rate of the single serial data stream, the bits without information and the parity bit of each channel being suppressed;

a second interface converter (IC2), responsive to a fourth serial data stream (F4) having information bits in a plurality of channels transmitted at said one half of the input bit rate, for providing a fifth serial data stream (F5) to which it adds, after each channel of the fourth serial data stream, a byte without information, in this way doubling the bit rate of the fourth serial data stream (F4), and a first line transmitter (TX1), responsive to the fifth serial data stream (F5), for providing a parity bit for each channel and placing it in a last channel position, for providing a sixth serial data stream (F6) and a seventh serial data stream (F7), identical to each other at an output bit rate equal to said input bit rate, wherein said first input serial data stream (F1) and said second input serial data stream (F2) together with said sixth serial data stream (F6) and said seventh serial data stream (F7) comprise a first redundant, bidirectional, proprietary interface bus for use within proprietary equipment and wherein said third serial data stream (F3) together with said fourth serial data stream (F4) comprise a nonredundant, bidirectional, first standard interface bus for use outside said proprietary equipment;

a second line receiver (RX2), responsive to an eighth input serial data stream (F8) and a ninth input serial data stream (F9), identical to each other, for providing a second single serial data stream corresponding to one of the eighth and ninth input serial data streams that is selected by a second control signal (CS2) to which the second line receiver is also responsive;

a first memory module (MM1), responsive to a memory write signal and to the second signal serial data stream, for temporarily storing four consecutive data frames for providing, in response to a memory read signal, a first bus (B1) containing eight streams that constitute bursts held in a standard interface, the write and read signals provided by a memory control module (MCM) of the interface conversion device;

a second memory module (MM2), responsive to a second bus (B2) having various standard interface streams in which are stored, in response to address signals provided by the memory control module (MCM), the various standard interface streams having data equivalent to four consecutive frames such that, in response to read signals provided by the memory module, a tenth (F10) serial data stream is provided; and a second line transmitter (TX2) responsive to the tenth serial data stream (F10) for inserting four cyclic redundancy check bits in channels 15 and 31 for providing an eleventh serial data stream (F11) and a twelfth serial data stream (F12) which are identical, wherein said eighth input serial data stream (F8) and said ninth input serial data stream (F9) together with said tenth serial data stream (F10) and said twelfth serial data stream (F12) comprise a second redundant, bidirectional, proprietary interface bus for use within said proprietary equipment and wherein said first bus (B1) together with said second bus (B2) comprise a nonredundant, bidirectional, second standard interface bus for use outside said proprietary equipment.

2. The interface conversion device of claim 1, wherein the first line receiver (RX1) provides a first alarm signal (A1) indicative of whether the first and/or the second input serial data streams (F1, F2) have a parity error, or if they are not identical to each other.

3. The interface conversion device of claim 1, wherein the second line receiver (RX2) provides a second alarm signal (A2) indicative of whether the eighth and/or ninth input serial data streams (F8, F9) have a cyclic redundancy check error, or if both data streams are not identical to each other.

4. The interface conversion device of claim 3, wherein the control unit (CU) is for providing a first transmission synchronising signal (STF3) for the third serial data stream (F3), a first reception synchronising signal (SRF4) for the fourth serial data stream (F4), a second transmission synchronising signal (STB1) for the standard streams on the first bus (B1) and a second reception synchronising signal (SRB2) for the standard streams on the second bus (B2), coinciding in every case with bit 0 of channel 0 in a transmission direction and with bit 7 of channel 31 in a reception direction; and for further providing a first output clock signal (CKF34) and a second output clock signal (CKB12) corresponding respectively to the third and fourth serial data streams (F3, F4) and to the first and second buses (B1, B2).

5. The interface conversion device of claim 1, further comprising: a control unit (CU), responsive to an alarm signal (A1, A2) from the line receivers (RX1, RX2), for providing corresponding control signals (CS1, CS2) for selecting which of the input serial data streams to each receiver is to be as the respective single and second single serial data streams.

6. The interface conversion device of claim 5, wherein the control unit (CU) is responsive to a system clock signal (CKM) from which, by means of consecutive divisions, it provides a plurality of internal clock signals; and also is responsive to a reference clock signal (CKR) which, in turn, samples the system clock signal (CKM) in order to detect its presence, in such a way that if a number of equal consecutive samples of the system clock signal (CKM) is greater than a determined value, timing is considered to be lost, this situation being indicated by means of a corresponding alarm in a register bank (RB).

7. The interface conversion device of claim 6, further comprising: an input/output unit (IOU) connected to the register bank (RB) for performing reading and writing functions for the register bank and which also has address, data and control buses (AB, PB, CB) for communicating with a device separate from the interface conversion device for programming and controlling of registers in the register bank (RB).

8. The interface conversion device of claim 1, further comprising: a register bank (RB) connected to the receivers (RX1, RX2), the transmitters (TX1, TX2), the memory modules (MM1, MM2) and the converters (IC1, IC2) that comprise the conversion device through an internal bus (IB) and in which is stored a configuration of a parity type for all the channels in the frames or only for some of them in a selective manner.

9. The interface conversion device of claim 8, wherein the control unit (CU) commands on the internal bus, according to a content of registers in the register bank (RB) in order to transmit test patterns and/or receive test patterns, either for all the channels included in each data stream or for part of them in a selective manner.

10. An interface conversion device, comprising:

a line receiver, responsive to a first pair of identical input serial data streams, for providing a selected single serial data stream corresponding to one of the pair of input serial data streams that is selected by a control signal for controlling the line receiver;

a first memory module, responsive to a memory write signal and to the selected single serial data stream, for temporarily storing four consecutive data frames for providing, in response to a memory read signal, a first bus containing eight serial data streams that constitute bursts held in a standard interface, the write and read signals provided by a memory control module of the interface conversion device;

a second memory module, responsive to a second bus having various standard interface streams in which are stored, in response to address signals provided by the memory control module, the various standard interface streams having data equivalent to four consecutive frames such that, in response to read signals provided by the memory module, a second serial data stream is provided; and a line transmitter, responsive to the second serial data stream, for inserting four cyclic redundancy check bits in selected channels, for providing a pair of identical serial output data streams.

\* \* \* \* \*

UNITED STATES PATENT AND TRADEMARK OFFICE
CERTIFICATE OF CORRECTION

PATENT NO. : 5,592,653
DATED : January 7, 1997
INVENTOR(S) : Amengual Guedan et al It is certified that error appears in the above-indentified patent and that said Letters Patent is hereby corrected as shown below: On the title page:

At INID [19], please cancel "Guedan et al." and substitute therefor --Amengual Guedan et al--;

At INID [75], please cancel "Juan A. Guedan!;Ana Ma del Mar M Martin" and substitute therefor --Juan Amengual Guedan; Ana M. del Mar Menendez Martin--.

At INID [57],,line 11, please cancel "(RK2) and substitute therefor --(RX2)--.

At column 2, line 8, please cancel "a eighth and a ninth" and substitute therefor --eighth and ninth--.

At column 5, line 5 (claim 1, line 2), please cancel "received" and substitute therefor --receiver--.

Signed and Sealed this

Seventeenth Day of June, 1997

Attest:

BRUCE LEHMAN

*Attesting Officer*  *Commissioner of Patents and Trademarks*